United States Patent [19]

Gleim et al.

[11] 4,371,393
[45] Feb. 1, 1983

[54] ZERO VALENT METAL RECOVERY WITH POLYACETYLENE

[75] Inventors: Robert D. Gleim, Newtown; Richard T. Gray, Levittown, both of Pa.

[73] Assignee: Rohm and Haas Company, Philadelphia, Pa.

[21] Appl. No.: 269,290

[22] Filed: Jun. 2, 1981

[51] Int. Cl.$^3$ .......................... C22B 11/04; C22B 5/00
[52] U.S. Cl. .................................. 75/108; 75/118 R; 75/121; 423/138; 252/430; 210/688; 210/732; 210/757; 526/285
[58] Field of Search .................. 252/430; 75/108, 121, 75/118; 423/1, 22, 23, 658.5, 659; 526/285

[56] References Cited

U.S. PATENT DOCUMENTS

| | | | |
|---|---|---|---|
| 3,578,626 | 5/1971 | Kornicker | 526/285 |
| 3,817,745 | 6/1974 | Copes | 75/108 |
| 3,974,095 | 8/1976 | Volpin | 252/430 |

OTHER PUBLICATIONS

Clarke et al., in *Journal Chem. Soc.*, Chemical Communications, No. 12, Jun., 1978, pp. 489, 490.

*Primary Examiner*—Brian E. Hearn
*Attorney, Agent, or Firm*—Jordan J. Driks

[57] ABSTRACT

A process for the production of a zero valent metal from an aqueous solution of a salt of the metal comprises contacting the solution with polyacetylene for a period of time sufficient to reduce at least a portion of the metal salt to a zero valent metal while leaving the polyacetylene in a substantially non-doped state. The metal salt has a reduction potential of about +0.5V or greater.

13 Claims, No Drawings

ZERO VALENT METAL RECOVERY WITH POLYACETYLENE

BACKGROUND OF THE INVENTION

This invention relates to the production of a zero valent metal from an aqueous solution containing a metal salt. More particularly, this invention relates to the production of a zero valent metal from an aqueous solution containing a salt of a metal wherein the metal salt has a reduction potential of at least about +0.5 V or greater.

Heretofore, zero valent metals have been recovered from solutions of their salts in one of several ways. Such metals have frequently been recovered using ion exchange resins whereby the metal salts of the solution are bound to functional groups which exist on a polymeric backbone and thereby concentrated. This ion exchange treatment has generally been followed by combustion of the resin whereby the metal is recovered directly as a result of the combustion or is recovered by electrochemical or chemical deposition of the metal eluted from its bound position on the ion exchange resin.

Zero valent metals have also been recovered directly from a solution of a metal salt by an electrochemical exchange reaction between the dissolved metal salt and a more electropositive zero valent base metal.

An additional method for recovering zero valent metal from its solution involves chemical treatment of the metal salt to precipitate an insoluble salt or complex which is then followed by further treatment such as combustion, reduction of the metal salt by chemical or electrolytic means, or by hydrogenation.

The processes set forth above suffer from the disadvantage that they all involve multistep sequences, with the economic disadvantages attendant to such multisteps, and, in some instances, such processes are pH dependent and often employ expensive regenerants. Additionally, not all of the processes set forth above obtain the zero valent metal in a relatively pure state and require additional complex refining steps.

The Journal of the Chemical Society, Chemical Communications, No. 12, pages 489 and 490, T. C. Clarke, et al (June 14, 1978) is directed to the production of doped polyacetylene film to give a high electrically conducting polyacetylene and modification of the conductivity of such polyacetylene by treatment with Lewis bases. The journal article sets forth that polyacetylene film, when exposed to silver perchlorate or silver tetrafluoroborate in toluene, results in the doping of polyacetylene film and the production of free silver. However, the production of free silver is incidental to the main purpose, i.e. the doping of polyacetylene film. When polyacetylene film is doped, the doping of the polyacetylene film will reduce, to some extent, the capacity of the polyacetylene to reduce the metal salt to a zero valent metal. Therefore, the use of a doped polyacetylene film to reduce a metal salt to the zero valent metal is less efficacious then the use of a polyacetylene which is not doped.

It is an object of this invention, therefore, to provide a process for the production of zero valent metals from a solution of salts of the desired metal.

Another object of this invention is to provide a process to separate one or more metals from an aqueous solution of the salts of the several metals dissolved in said solution.

Other objects and advantages will become apparent from the following more complete description and claims.

DETAILED DESCRIPTION

This invention contemplates a process for the production of a zero valent metal from an aqueous solution of a salt of said metal comprising contacting said metal salt solution, wherein said metal salt has a reduction potential of about +0.5 V greater, with polyacetylene for a period of time sufficient to reduce at least a portion of said metal salt to a zero valent metal while leaving said polyacetylene in a substantially non-doped state.

Reduction potential values used herein are relative to the standard hydrogen electrode.

Polyacetylene, which is useful in practising this invention, may be in the form of a film, powder or foam. The preparation of polyacetylene film is described in Journal of Polymer Science. Vol. 2., p. 23 (1971) and Vol. 4, p. 460 (1973), both H. Shirakawa et al and the preparation of polyacetylene powder is described in Proceedings of the National Academy of Lincei, Class of Physical, Mathemetical and Natural Sciences, Reports, Vol. 8 3(1958) G. Natta et al. Additionally, the preparation of polyacetylene foam is described in Journal of Polymer Science; Polymer Letters Edition, Volume 17, pages 779-786, Wnek. Polyacetylene foams may be prepared by polymerizing acetylene gas in the presence of a Ziegler-Natta type catalyst at concentrations that are less than normally employed when forming a film. After the polyacetylene gel is obtained, solvent is removed under vacuum from the gel and the solvent is replaced with benzene. The benzene in the gel is then frozen and the benzene is then sublimed to prepare the polyacetylene foam.

In practising this invention, the aqueous solvent soluble salts of gold, silver, platinum, rhodium, palladium, iridium and mercury and the like which are water soluble and which have a reduction potential of at least about +0.5 V or greater may be used.

The metal salts which may be used include organic metal salts, inorganic metal salts, and dissociable metal complexes and generally, any metal salt which has a reduction potential of at least about +0.5 V or greater and which is capable of being dissolved in an aqueous solvent. Among such salts may be mentioned gold (III) chloride, silver (I) nitrate, palladium (II) chloride, platinum (II) chloride, palladium (II) chloride, platinum (II) chloride, palladium (II) chloride complex (Pl $Cl_4^{-2}$), gold (III) tetrachloride complex ($AuCl_4^-$), rhodium (III) chloride, gold (III) thiocyanate, iridium (III) chloride complex (Ir $Cl_6^{-3}$), mercuric acetate, and the like.

Although water alone is the preferred solvent for the aforesaid metal salts because it is inexpensive, easy to handle, readily available and non-toxic, a water soluble cosolvent may also be used. The only criterion for the cosolvent used in practising this invention is that the cosolvent must be compatible with polyacetylene and the metal salt must be soluble in the aqueous solvent system used. Thus, cosolvents such as isopropanol, methanol, ethanol, acetone, diglyme, dimethylformamide, ethylene glycol, and the like may be used. The cosolvent used should also be compatible with the metal salt and should not remove any of the metal salt from the solution. In other words, the cosolvent used should not insolubilize the metal salt or convert the metal salt to an insoluble complex or to another compound which has a reduction potential below about at least +0.5 V.

The cosolvent used may be present in any amount subject only to the aforediscussed cosolvent criteria.

The temperature at which the process is practiced may vary widely. Generally, the metal salt solution and the polyacetylene may be in contact with one another at a temperature above the freezing point of the metal salt solution and below the boiling point of the metal salt solution. Such freezing and boiling points may be modified by an appropriate choice of a cosolvent.

Generally, the higher the temperature of the metal salt solution, when contacted with the polyacetylene, the faster the rate of reduction of the metal salt to the zero valent state. When it is preferred, for reasons of economy, the metal salt solution may be contacted with the polyacetylene at an ambient temperature, for example, 25° C. The optimum temperature for reduction of the metal salt in solution to its zero valent state, when contacting the polyacetylene, will also depend somewhat on the particular metal salt being used. This may readily be determined by routine laboratory procedures as will be apparent to one skilled in the art.

The amount of polyacetylene used for each gram of recoverable zero valent metal may vary depending on the metal to be recovered and economic and processing considerations. For example, one gram of polyacetylene may be used for each gram of recoverable zero valent metal in the metal salt solution. However, there is an advantage to using less than one gram of polyacetylene for each gram of recoverable zero valent metal in that if the zero valent metal is to be recovered from the polyacetylene by a combustion operation whereby the polyacetylene is burned away, there is less combustion of polyacetylene required to recover the zero valent metal. If, however, more than one gram of polyacetylene is used for each gram of produceable zero valent metal then the rate of reduction of the metal salt to the zero valent state tends to be faster. Other factors which will influence the amount of polyacetylene used are the monetary value of the recoverable zero valent metal and the concentration of the metal salt in the aqueous solution. If the metal salt solution is dilute, then one would tend to use a greater amount of polyacetylene than if the metal salt solution is more concentrated.

In practicing this invention, the polyacetylene is contacted with the aqueous solution of metal salt. This may be done in any suitable manner such as by placing polyacetylene powder, film, or foam in a vat containing a solution of the metal salt and then agitating the solution and polyacetylene sufficiently to assure satisfactory contact of the metal salt solution with the polyacetylene. The zero valent metal is thus produced while leaving the polyacetylene, throughout the process, in a substantially non-doped state.

In yet another method, the polyacetylene may be disposed within a column and a solution of a metal salt may be continuously passed through the column until sufficient zero valent metal has been produced.

Because a large portion of the available metal will be produced as the zero valent metal in the first hour of treatment of the metal salt with polyacetylene, it may be economically desirable to produce only a portion of the available metal in the metal salt as zero valent metal and then recycle the remaining solution, along with additional solution, in a continuous manner so as to continuously produce a large portion of metal in a short period of time. For example, when an aqueous solution of silver nitrate, containing 560 parts per million of silver nitrate, is being treated with polyacetylene, after a single pass through a one inch diameter, one foot long column containing 20 grams of polyacetylene powder, only 0.4 part per million of silver nitrate remains in solution.

The zero valent metal may be recovered in a crude state by burning the polyacetylene-metal composition at a temperature of about 250° C. or greater. In a typical metal refining operation, semi-purified gold or silver may be cast into a bar by burning the polyacetylene at a temperature of about 1100° C.

The crude zero valent metal may also be recovered from the polyacetylene by mechanically shaking the zero valent metal loose from the polyacetylene. Other methods for recovering the zero valent metal from the polyacetylene will be apparent to one skilled in the art.

The process of this invention may also be used to produce one or more zero valent metals from a solution of a plurality of salts of different metals. For example, only zero valent silver will be produced using the process of this invention, from an aqueous solution of cupric nitrate and silver nitrate.

As will readily be understood, the process of this invention may also be used to produce a mixture of zero valent metals from a solution of salts of metals whereby a lesser number of zero valent metals is produced from a solution of salts of a greater number of metals than those produced in the zero valent state. In this manner, subsequent separation of the mixture of zero valent metals will be facilitated because a mixture of a smaller number of zero valent metals will be handled as compared to handling the greater number of metals whose salts are in solution.

All that is necessary, in order to produce one or more zero valent metals from a solution of salts of different metals, is that the salt or salts of the desired zero valent metal or metals have a reduction potential of about $+0.5$ V or greater and that the salt or salts of the undesired metal or metals have a reduction potential of less than about $+0.5$ V.

The process of this invention may also be used to lower the oxidation state of a metal salt to a lower oxidation state without producing a zero valent metal. For example, an aqueous solution of ferric chloride (reduction potential of above $+0.5$ V) may, by using the process of this invention, be converted to ferrous chloride (reduction potential of below $+0.5$ V). Zero valent iron will not be produced from the ferrous chloride, using the process of this invention, because ferrous chloride has a reduction potential less than $+0.5$ V.

Among the metal salts whose oxidation state may be lowered without reducing the metal salt to a zero valent metal are the water soluble salts (having a reduction potential of $+0.5$ V or greater) of iron ($+3$), cerium ($+4$), cobalt ($+3$), thallium ($+3$) and the like.

In the examples which follow, the amount of metal in solution was determined using atomic absorption techniques, as described in Perkin Elmer Handbook, Analytical Methods For Atomic Absorption Spectrophotometry, revised September, 1976, Perkin Elmer Corporation, part No. 303-0152.

Unless otherwise stated, all examples are conducted at a room temperature of about 25° C.

In order to more fully illustrate the nature of this invention and the manner of practicing the same, the following examples are presented.

EXAMPLE 1

To a glass vessel equipped with a stir bar and a magnetic stirrer is added 100 milliliters of deionized water containing 10 milliliters of aqua regia and 5 milliliters of isopropanol. To this is then added an aqueous solution containing 1.01 grams (3.33 millimoles) of gold (III) chloride. The combined solution contains 5,000 parts per million of gold in the form of the gold salts.

To the gold containing solution is added 10.0 grams of dry polyacetylene powder and the slurry of polyacetylene powder-gold solution is magnetically stirred while exposed to the atmosphere. Approximately 2 milliliter samples of the gold salt containing solution are withdrawn at regular intervals, filtered and the filtrate analyzed to determine the amount of gold remaining in the solution. The results are as follows:

| Sample No. | Length of Time (minutes) sample is in contact with polyacetylene | Amount of gold in solution (ppm) |
| --- | --- | --- |
| Control (no contact with polyacetylene powder) | 0 | 5,000 |
| 1 | 5 | 11 |
| 2 | 10 | 4 |
| 3 | 15 | 2 |
| 4 | 20 | 1.4 |
| 5 | 25 | 0.7 |
| 6 | 30 | 0.7 |

EXAMPLE 2

In a glass vessel containing 100 milliliters of an aqueous gold (III) chloride solution which, by analysis, contains 200 parts per million of gold, is added 1.0 gram of poyacetylene powder. The solution is exposed to air and is stirred magnetically. Approximately 2 ml. samples are periodically removed, filtered and the filtrate analyzed in the manner of Example 1. The results are as follows:

| Sample No. | Length of Time (minutes) sample is in contact with polyacetylene | Amount of gold in solution (ppm) |
| --- | --- | --- |
| Control (no contact with polyacetylene powder) | 0 | 200 |
| 2 | 60 | 0.1 |
| 3 | 300 | less than 0.1 |

EXAMPLE 3

To a three necked-round bottom flask equipped with a stir bar and magnetic stirrer is added an aqueous silver nitrate solution containing 5.0023 grams (0.029 mole) of silver nitrate, 100 milliliters of deionized water and 1 milliliter of isopropanol. A sample of about 2 milliliters of this solution is removed and analyzed for silver content. It is determined that 29,000 parts per million of silver are present. 10.0 grams of polyacetylene powder is added to the solution and the solution is stirred. Periodic samples (about 2 ml. each) are removed and filtered at regular time intervals. Each of the samples is analyzed to determine the amount of silver remaining in solution. The results are as follows:

| Sample No. | Length of Time (minutes) sample is in contact with polyacetylene | Amount of silver in solution (ppm) |
| --- | --- | --- |
| Control (no contact with polyacetylene powder) | 0 | 29,000 |
| 1 | 5 | 29,000 |
| 2 | 10 | 29,000 |
| 3 | 15 | 27,000 |
| 4 | 20 | 27,000 |
| 5 | 25 | 26,000 |
| 6 | 30 | 26,000 |
| 7 | 35 | 24,000 |
| 8 | 40 | 25,000 |
| 9 | 45 | 24,000 |
| 10 | 50 | 22,000 |
| 11 | 55 | 22,000 |
| 12 | 60 | 21,000 |
| 13 | 180 | 8,000 |
| 14 | 420 | 280 |

EXAMPLE 4

The procedure of Example 3 is repeated except that 5.004 grams (0.029 mole) of silver nitrate is added. A sample of about 2 milliliters is analyzed and is determined to contain 26,000 parts per million of silver. The solution is heated to 50° C. and 10 grams of polyacetylene powder is added. The temperature of 50° C. is maintained during the contact of the polyacetylene and the silver nitrate solution. About 2 ml. samples are periodically removed, filtered and the filtrate analyzed. The results are as follows:

| Sample No. | Length of Time (minutes) sample is in contact with polyacetylene | Amount of silver in solution (ppm) |
| --- | --- | --- |
| Control (no contact with polyacetylene powder) | 0 | 26,000 |
| 1 | 5 | 24,000 |
| 2 | 10 | 22,000 |
| 3 | 15 | 22,000 |
| 4 | 20 | 21,000 |
| 5 | 25 | 21,000 |
| 6 | 30 | 20,000 |
| 7 | 35 | 18,000 |
| 8 | 40 | 16,000 |
| 9 | 45 | 15,000 |
| 10 | 50 | 13,000 |
| 11 | 55 | 12,000 |

EXAMPLE 5

The procedure of Example 4 is repeated except that the silver nitrate containing solution is heated to 70° C. and maintained there during contact of the silver nitrate solution with the polyacetylene powder. The control sample (about 2 milliliters is analyzed and is determined to contain 25,000 parts per million of silver. The results are as follows:

| Sample No. | Length of Time (minutes) sample is in contact with polyacetylene | Amount of silver in solution (ppm) |
| --- | --- | --- |
| Control (no contact with polyacetylene powder) | 0 | 25,000 |

-continued

| Sample No. | Length of Time (minutes) sample is in contact with polyacetylene | Amount of silver in solution (ppm) |
| --- | --- | --- |
| 1 | 5 | 15,000 |
| 2 | 10 | 5,000 |
| 3 | 15 | 1,200 |
| 4 | 20 | 194 |
| 5 | 25 | 16 |
| 6 | 30 | 3 |
| 7 | 35 | 2.4 |
| 8 | 40 | 2.3 |
| 9 | 45 | 2.2 |

EXAMPLE 6

The procedure of Example 3 is repeated except that 5.00 grams of silver nitrate is used. Prior to contacting the solution with polyacetylene, the flask is heated to 90° C. and a control sample (about 2 milliliters) is withdrawn and analyzed for silver content. The sample is thus determined to contain 26,000 parts per million of silver. The temperature of 90° C. is maintained throughout the time of contact with the polyacetylene powder. Samples are withdrawn and analyzed as set forth in Example 3. The results are as follows:

| Sample No. | Length of Time (minutes) sample is in contact with polyacetylene | Amount of silver in solution (ppm) |
| --- | --- | --- |
| Control (no contact with polyacetylene powder) | 0 | 26,000 |
| 2 | 10 | 1.9 |
| 3 | 30 | 0.4 |

EXAMPLE 7

0.998 gram of polyacetylene powder is added to 1.998 grams of silver nitrate (0.0117 mole) in 20 milliliters of deionized water. A sample is removed and analyzed and it is determined that there is present 49,915 parts per million of silver in the solution. The vessel containing the polyacetylene powder-silver nitrate solution is sealed under nitrogen. Samples are periodically withdrawn, filtered and the filtrate analyzed for silver. The results are as follows:

| Sample No. | Length of Time (days) sample is in contact with polyacetylene | Amount of silver in solution (ppm) |
| --- | --- | --- |
| Control (no contact with polyacetylene powder) | 0 | 49,915 |
| 1 | 7 | 7,000 |
| 2 | 17 | 410 |
| 3 | 26 | 7 |

After the 26 days an additional 0.101 gram of silver nitrate is added to the vessel. Samples are periodically removed from the vessel, filtered and the filtrate analyzed for silver. The following results are obtained.

| Sample No. | Length of Time sample is in contact with polyacetylene | Amount of silver in solution (ppm) |
| --- | --- | --- |
| 1 | 1 minute | 2,400 |
| 2 | 11 days | 624 |
| 3 | 19 days | 50 |

The above Example demonstrates that the minimum quantity of silver nitrate which is reducible to free silver by polyacetylene under the conditions stated in the Example is 2.099 grams. At a silver content of the silver nitrate, of 63.5%, this corresponds to 1.33 grams of pure silver for each 0.998 gram of polyacetylene.

EXAMPLE 8

A solution containing 2.0 grams (0.0117 mole) of silver nitrate is placed in 20 milliliters of deionized water and is added to a flask containing 0.542 gram of polyacetylene film having a cis isomer content of at least 70%. Prior to placing the silver nitrate solution in contact with the polyacetylene film, a sample is removed and analyzed. The sample is thus determined to contain 100,000 parts per million of silver. About 2 ml. samples of the solution are periodically removed, filtered and the filtrate analyzed for silver. The results are as follows:

| Sample No. | Length of Time (days) sample is in contact with polyacetylene | Amount of silver in solution (ppm) |
| --- | --- | --- |
| Control (no contact with polyacetylene film) | 0 | 100,000 |
| 1 | 6 | 52,000 |
| 2 | 14 | 45,000 |
| 3 | 37 | 48,000 |

A minimum capacity of polyacetylene to reduce the silver can be obtained because 1.1 grams of silver nitrate is reduced. This corresponds to 1.29 grams of silver metal for each gram of polyacetylene film.

EXAMPLE 9

To a flask containing 20 milliliters of deionized water and 1 milliliter of isopropanol is added 0.1549 gram of gold (III) chloride and then 0.1005 gram of polyacetylene powder. After six days a 2 milliliter sample of the solution is removed, filtered and the filtrate analyzed for gold and is found to contain 0.3 part per million, or less, of gold. An additional 0.100 gram of gold (III) chloride is added to the residual solution. After six additional days the solution is filtered and analyzed for gold. One part per million or less of gold remains in solution. Thus, a total of 0.2549 gram of gold (III) chloride is reduced to zero valent gold which corresponds to 1.39 grams of gold recovered by one gram of polyacetylene.

EXAMPLE 10

To a flask containing 20 milliliters of deionized water is added 0.202 gram of gold (III) chloride. To this flask is then added a 4 cm. by 4 cm. piece of polyacetylene film having a thickness of $7.62 \times 10^{-3}$ cm. The polyacetylene weighs 0.130 gram. The flask is sealed, under a nitrogen atmosphere, and is allowed to stand at room temperature for 5 days. A sample is removed from this flask, filtered and the filtrate analyzed for gold. It is determined that the filtrate contains 3.5 parts per million of gold. An additional 0.100 gram of gold (III) chloride is added to the flask and the flask is again sealed and allowed to stand for an additional 6 days. At the end of the six days, the flask is unsealed and a sample of the solution is filtered and the filtrate is analyzed and is found to contain 10.3 parts per million of gold. Thus, the minimum capacity, under the conditions of this Example is 1.27 grams of gold for each gram of polyacetylene film.

EXAMPLE 11

To a flask containing 100 milliliters of deionized water and 5 milliliters of isopropanol is added 5.00 grams of silver nitrate and 5.0 grams of cupric nitrate. A sample of the solution is removed (about 2 milliliters) and is analyzed for both silver and copper. The analysis shows that the sample contains 26,000 parts of silver and 14,000 parts of copper. To this solution is then added 5.00 grams of polyacetylene powder. The polyacetylene powder-metal salt solution is stirred using a magnetic stirrer and stir bar. Samples are removed from the solution, at periodic intervals, filtered and the filtrate analyzed for both silver and copper. The results are as follows:

| Sample No. | Length of Time (minutes) sample is in contact with polyacetylene | Parts per million remaining in solution Silver | Copper |
|---|---|---|---|
| Control (no contact with polyacetylene powder) | 0 | 26,000 | 14,000 |
| 1 | 15 | 18,000 | 14,000 |
| 2 | 30 | 17,000 | 14,000 |
| 3 | 45 | 17,000 | 14,000 |
| 4 | 60 | 16,000 | 14,000 |
| 5 | 75 | 15,000 | 14,000 |
| 6 | 90 | 15,000 | 14,000 |
| 7 | 105 | 13,000 | 14,000 |
| 8 | 120 | 13,000 | 14,000 |
| 9 | 150 | 12,000 | 14,000 |
| 10 | 180 | 10,000 | 14,000 |
| 11 | 210 | 10,000 | 14,000 |
| 12 | 240 | 8,000 | 14,000 |
| 13 | 5,280 | 7 | 14,000 |

EXAMPLE 12

To a flask containing 100 milliliters of palladium (III) chloride solution (1,000 micrograms per ml. of palladium) is added one milliliter of isopropanol. The palladium salt solution also contains 1.6% by volume of hydrochloric acid and 0.9% by volume of nitric acid. A sample of about 2 ml. of the palladium salt solution is removed and is analyzed for palladium. It is thus determined that there are 990 parts per million of palladium. Polyacetylene powder (2.0 grams) is added to the solution and the solution is stirred using a magnetic stirrer and stir bar. Samples are periodically removed, filtered and the filtrate analyzed for palladium. The results are as follows:

| Sample NO. | Length of Time (minutes) sample is in contact with polyacetylene | Amount of palladium in solution (ppm) |
|---|---|---|
| Control (no contact with polyacetylene powder) | 0 | 990 |
| 1 | 10 | 740 |
| 2 | 20 | 610 |
| 3 | 30 | 530 |
| 4 | 40 | 490 |
| 5 | 50 | 430 |
| 6 | 60 | 400 |
| 7 | 70 | 360 |
| 8 | 80 | 330 |
| 9 | 90 | 310 |
| 10 | 100 | 290 |
| 11 | 110 | 260 |
| 12 | 120 | 240 |
| 13 | 150 | 200 |
| 14 | 180 | 170 |
| 15 | 210 | 130 |
| 16 | 240 | 110 |

EXAMPLE 13

A one inch diameter by one foot long glass column is packed with 20 grams of polyacetylene powder. The powder is prewetted with one bed volume of isopropanol and 4 bed volumes of deionized water. Analysis of a sample of the platinum (III) chloride solution to be passed through the column determines that the solution contains 58 parts per million of platinum. The column is drained and 500 milliliters of a platinum (III) chloride solution in 10% (by volume) ammonium hydroxide is passed through the column. The solution is passed through the column 5 times. Each pass through the column is of approximately 40 minute duration. After each pass through the column, a sample of the solution is then analyzed for platinum. The results are as follows:

| No. of passes through column | Amount of platinum in solution (parts per million) |
|---|---|
| Control-o | 58 |
| 1 | 3 |
| 2 | 6 |
| 3 | 1 |
| 4 | 3 |
| 5 | 2 |

EXAMPLE 14

Two liters of a silver nitrate/cupric nitrate solution containing about 5.7 troy ounces of silver per gallon of solution and about 1.9 troy ounces of copper are heated to between 55° C. to 65° C. A sample of the solution is removed and analyzed and is found to contain 5.7 troy ounces of silver per gallon of solution. 123 grams of polyacetylene powder is mixed into the hot solution. The solution-polyacetylene mixture is intermittently stirred and samples (about 20 ml. each) of the solution is periodically removed, filtered and analyzed. The results are as follows:

| Sample No. | Length of Time (hours) sample is in contact with polyacetylene | Amount of silver remaining in solution (troy ounces per gallon) |
|---|---|---|
| Control (no contact with polyacetylene | | |

-continued

| Sample No. | Length of Time (hours) sample is in contact with polyacetylene | Amount of silver remaining in solution (troy ounces per gallon) |
|---|---|---|
| powder) | 0 | 5.7 |
| 1 | 0.5 | 1.20 |
| 2 | 1.0 | 0.15 |
| 3 | 2.0 | 0.0018 |

The polyacetylene-silver composition is filtered through a Buchner funnel, alternately washed with water then 10% (volume) ammonium hydroxide three times, each time with about four liters of water and four liters of ammonium hydroxide.

The now silver rich polyacetylene is placed in a silicon carbide crucible, capped with a soda ash/borax flux to prevent melt losses and placed into a gas fired furnace which is at a temperature of about 1100° C. and allowed to remain there for about 90 minutes. The crucible is then removed and molten silver is poured from the crucible into molds. The yield is 2.7 troy ounces of silver which, by standard fine silver titrimetric technique analyzed at a 97.8% (by weight) purity.

EXAMPLE 15

One liter of gold process stream containing 102 grams of recoverable gold in aqua regia solution is diluted with 9 volumes of distilled water. A 20 ml. sample of this solution is removed and analyzed for gold content and it is determined that 12.66 troy ounces of gold per gallon is present. 104 grams of polyacetylene is added and the polyacetylene-gold solution is intermittently stirred. Samples (about 20 ml.) are periodically withdrawn, filtered and the filtrate analyzed for gold. The results are as follows:

| Sample No. | Length of time (hours) sample is in contact with polyacetylene | Amount of gold remaining in solution (troy ounces per gallon) |
|---|---|---|
| Control (no contact with polyacetylene powder) | 0 | 12.66 |
| 1 | 1 | 0.106 |
| 2 | 2 | 0.00097 |

The polyacetylene-gold slurry composition is filtered using a Buchner funnel, washed with water (about 4 liters) and then washed with 10% (volume) ammonium hydroxide and again filtered. The filter cake is immersed in 4 liters of 10% (volume) ammonium hydroxide and allowed to stand overnight. The slurry is then filtered and washed with water and again filtered. The filter cake is then smelted as in Example 14. The total weight of the two gold bars formed after smelting is 3.7 troy ounces.

While this invention has been described in terms of certain preferred embodiments and illustrated by means of specific examples, the invention is not to be construed as limited except as set forth in the following claims.

We claim:

1. A process for the production of a zero valent metal from an aqueous solution of a salt of said metal comprising contacting said metal salt solution, wherein said metal salt has a reduction potential of about +0.5 V or greater, with polyacetylene for a period of time sufficient to reduce at least a portion of said metal salt to a zero valent metal while leaving said polyacetylene in a substantially non-doped state.

2. A process according to claim 1 wherein said polyacetylene is polyacetylene film.

3. A process according to claim 1 wherein said polyacetylene is polyacetylene powder.

4. A process according to claim 1 wherein said polyacetylene is polyacetylene foam.

5. A process according to claim 1 wherein said metal salt is a salt of gold.

6. A process according to claim 1 wherein said metal salt is a salt of silver.

7. A process according to claim 1 wherein said metal salt is a salt of platinum.

8. A process according to claim 1 wherein said metal salt is a salt of palladium.

9. A process according to claim 1 wherein a plurality of metal salts is present in said solution and at least one of said metal salts has a reduction potential of about +0.5 V or greater.

10. A process according to claim 9 wherein said metal salts are cupric nitrate and silver nitrate.

11. A process according to claim 1 wherein said metal salt solution is at a temperature above the freezing point of said solution and below the boiling point of said solution.

12. A process according to claim 1 wherein said metal salt solution is at a temperature of from about 25° C. to about 90° C.

13. A process according to claim 1 wherein said zero valent metal is recovered from said polyacetylene.

* * * * *